(12) United States Patent
Wang et al.

(10) Patent No.: US 12,020,034 B2
(45) Date of Patent: Jun. 25, 2024

(54) INSTRUCTION EXECUTION METHOD AND INSTRUCTION EXECUTION DEVICE

(71) Applicant: Shanghai Zhaoxin Semiconductor Co., Ltd., Shanghai (CN)

(72) Inventors: Weilin Wang, Beijing (CN); Yingbing Guan, Shanghai (CN); Long Cheng, Shanghai (CN); Lei Yi, Xi'an (CN)

(73) Assignee: SHANGHAI ZHAOXIN SEMICONDUCTOR CO., LTD., Shanghai (CN)

( * ) Notice: Subject to any disclaimer, the term of this patent is extended or adjusted under 35 U.S.C. 154(b) by 0 days.

(21) Appl. No.: 18/052,908

(22) Filed: Nov. 4, 2022

(65) Prior Publication Data

US 2023/0161593 A1   May 25, 2023

(30) Foreign Application Priority Data

Nov. 22, 2021   (CN) .......................... 202111386079.2

(51) Int. Cl.
*G06F 9/38* (2018.01)
*G06F 9/30* (2018.01)

(52) U.S. Cl.
CPC ........ *G06F 9/3836* (2013.01); *G06F 9/30101* (2013.01); *G06F 9/30145* (2013.01)

(58) Field of Classification Search
None
See application file for complete search history.

(56) References Cited

U.S. PATENT DOCUMENTS

| | | | | |
|---|---|---|---|---|
| 6,076,156 A | * | 6/2000 | Pickett | G06F 9/30185 712/E9.035 |
| 7,401,358 B1 | * | 7/2008 | Christie | G06F 21/10 711/163 |
| 7,603,551 B2 | * | 10/2009 | McGrath | G06F 9/4403 713/164 |
| 11,782,766 B2 | * | 10/2023 | Mooring | G06F 9/455 718/1 |
| 2003/0226014 A1 | * | 12/2003 | Schmidt | G06F 21/74 713/164 |
| 2008/0148048 A1 | | 6/2008 | Govil | |
| 2010/0205415 A1 | * | 8/2010 | Henry | G06F 9/30058 712/234 |
| 2017/0228535 A1 | * | 8/2017 | Shanbhogue | G06F 12/0811 |
| 2019/0050232 A1 | * | 2/2019 | Brannock | G06F 21/44 |
| 2019/0205061 A1 | * | 7/2019 | Weissmann | G06F 3/0659 |
| 2022/0413860 A1 | * | 12/2022 | Subramaniam | G06F 9/3802 |

OTHER PUBLICATIONS

Non-Final Office Action dated Jan. 3, 2024, issued in U.S. Appl. No. 18/052,909 (copy not provided).

* cited by examiner

*Primary Examiner* — Eric Coleman
(74) *Attorney, Agent, or Firm* — McClure, Qualey & Rodack, LLP

(57) ABSTRACT

An instruction execution method for a microprocessor is provided. The microprocessor includes a model specific register (MSR). And, the instruction execution method includes the following steps. A target instruction is received using an instruction cache. The target instruction is decoded using an instruction translator to determine whether the target instruction is a specific instruction is a specific instruction. When the target instruction is the specific instruction, a model specific register index of the target instruction is obtained to directly read or write the model specific register.

18 Claims, 8 Drawing Sheets

200

```
┌─────────────────────────────────┐
│  The instruction cache stores a target  │─ 210
│         instruction              │
└─────────────────────────────────┘
                │
                ▼
┌─────────────────────────────────┐
│ The instruction translator translates the target │
│  instruction to determine whether the target │
│  instruction is a specific instruction; when the │
│  target instruction is a specific instruction, a │─ 220
│   model specific register index of the target │
│  instruction is obtained to perform a specific │
│            operation              │
└─────────────────────────────────┘
```

FIG. 2

INSTRUCTION EXECUTION METHOD AND INSTRUCTION EXECUTION DEVICE

CROSS-REFERENCE TO RELATED APPLICATION

This application claims priority of China Application Serial Number 202111386079.2, filed on Nov. 22, 2021, the entirety of which is herein incorporated by reference.

BACKGROUND

Technical Field

The present inventions relates to an instruction execution mechanism, and in particular to a model specific register (MSR) instruction execution method and an instruction execution device.

Description of the Related Art

Generally speaking, the model specific register (MSR) of a processor is used to access certain functions of the processor. Theoretically, a MSR can only be accessed in a privileged state, and a general protection exception will be triggered if it is accessed in an unprivileged state. Therefore, when a processor needs to access some model specific register, it is necessary for this microprocessor to enter the privileged state at first.

Moreover, accesses to the model specific register needs to be carried out through some general-purpose registers, which means that the current contents of the general-purpose registers need to be saved elsewhere. Therefore, when the model specific registers are accessed, the processor needs to perform an indirect process that backs up the current contents of associated general-purpose registers in advance and then restores it thereafter, which makes the conventional accessing to the model specific registers a time-wasting approach due to the content backup and restoration operations.

Therefore, in order to reduce the backup/restore numbers arisen from accessing the model specific registers, how to directly access the model specific register in an unprivileged state has become a problem to be solved. In addition, there are a need in upgrading the performance of serialization of instruction flows, as well as a need in facilitating the serialization for the execution order of the internal features of a complex instruction.

BRIEF SUMMARY

An embodiment of the invention introduces an instruction execution method for a microprocessor. The microprocessor includes a model specific register (MSR). The instruction execution method includes the following actions. A target instruction is received by an instruction cache. The target instruction is translated by an instruction translator to determine whether this target instruction is a specific instruction. Moreover, when the target instruction is a specific instruction, the model specific register index of the target instruction is obtained to directly access the model specific register.

Another embodiment of the invention introduces an instruction execution device for a microprocessor. The instruction configuration and execution device includes an instruction cache, a model specific register (MSR) and an instruction translator. The instruction cache is configured to store a target instruction. The instruction translator is configured to obtain the target instruction from the instruction cache, and decode the target instruction to determine whether the target instruction is a specific instruction. When the target instruction is the specific instruction, a model specific register index of the target instruction is obtained to directly access the model specific register.

To sum up, the instruction execution method and instruction execution device of the present invention may use the instruction translator to translate the target instruction to determine whether the target instruction is a specific instruction. When the target instruction is the specific instruction, a model specific register index of the target instruction is obtained to directly access the model specific register. In this way, the microprocessor may directly access the model specific register in the privileged state or user state through the target instruction. The microprocessor does not need to perform backup and restore operations on associated general-purpose registers.

BRIEF DESCRIPTION OF THE DRAWINGS

The present invention may be fully understood by reading the subsequent detailed description and examples with references made to the accompanying drawings, wherein:

FIG. 2 is a flowchart illustrating an instruction execution method 200 according to an embodiment of the present invention;

DETAILED DESCRIPTION

The following description is of the preferred embodiments of the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

The invention discloses a device and a method that may avoid reading and writing a general-purpose register, and may read and write a model specific register (MSR) in a user state and a privileged state, so as to make the reading and the writing of the MSR more flexible.

The invention also discloses a device and method for implementing instruction serialization by avoiding reading and writing model specific register, and a device and a method for implementing serialization of internal features of an instruction.

Figure 1:
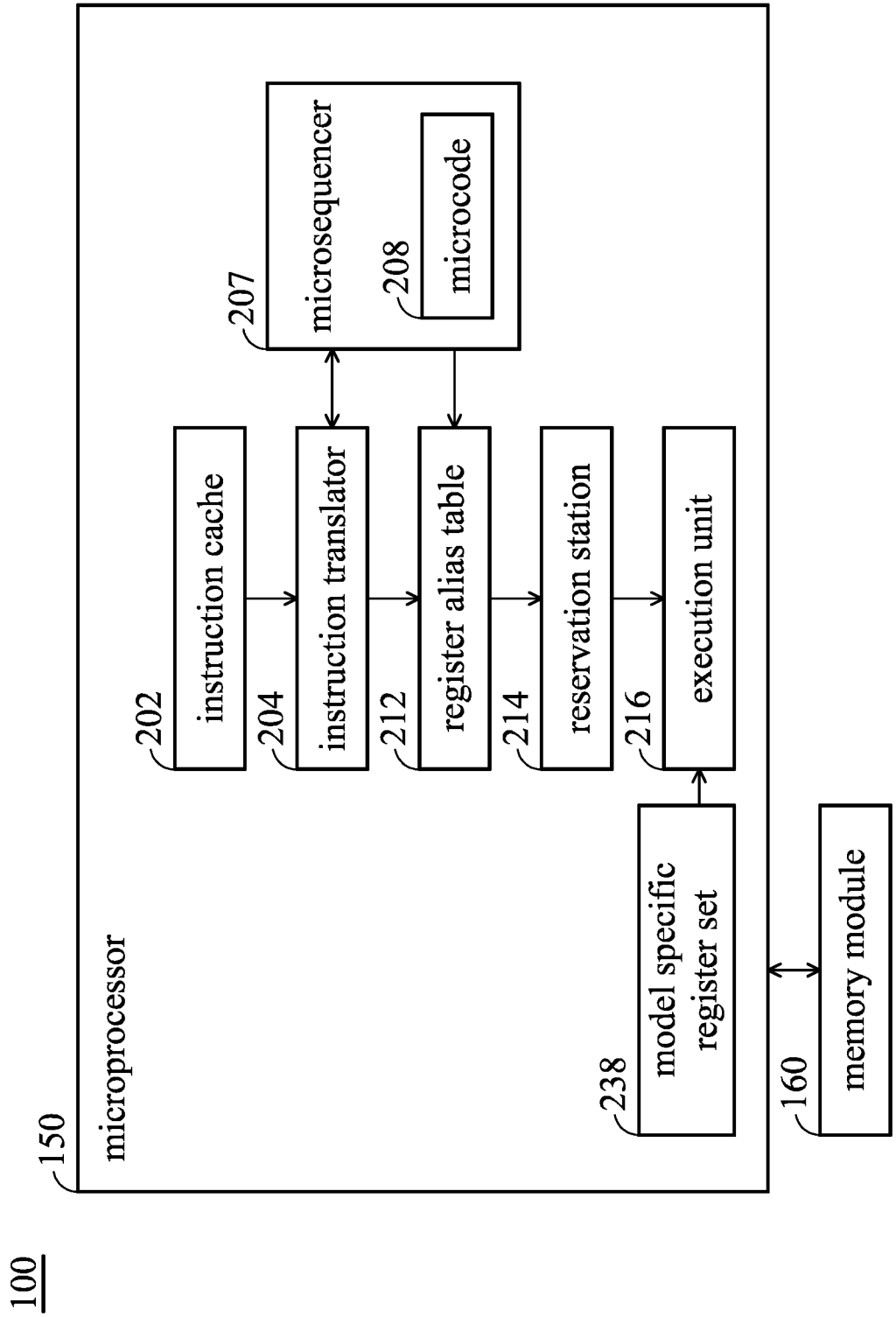
FIG. 1 is a block diagram illustrating an instruction execution device 100 according to an embodiment of the present invention.

In an embodiment, please refer to FIG. 1, which is a block diagram illustrating an instruction execution device 100 according to an embodiment of the present invention. In one embodiment, the instruction execution device 100 includes an instruction cache 202, a model specific register (MSR) set 238 and an instruction translator 204.

In one embodiment, the microprocessor 150 of the instruction execution device 100 includes an instruction cache 202, a model specific register set 238, an instruction translator 204, a register alias table 212, a reservation station 214, an execution unit 216, and a microsequencer 207. Moreover, the microcode 208 is stored in microsequencer 207.

In one embodiment, the microprocessor 150 is coupled to the memory module 160.

In one embodiment, the memory module 160 may be implemented with dynamic random access memory (DRAM).

In addition, the microprocessor may also be implemented by integrated circuit, such as a micro controller, a microprocessor, a digital signal processor, an application specific integrated circuit (ASIC) or a logic circuit. The microprocessor may support the operation of operating systems such as Windows, Linux, Android, IOS, etc., but the present invention is not limited thereto. The present invention may be applied to operating systems that support operations in privileged state and unprivileged state (e.g., user state).

In one embodiment, as shown in FIG. 1, the instruction execution device 100 includes an instruction cache 202 for storing macro instructions of an instruction set architecture such as an x86 instruction set architecture. In addition, the instruction translator 204 may receive macro-instructions and translate them into micro-instructions (micro-instructions or μops). Then, the microinstruction is provided to the register alias table (RAT) 212 for processing. The register alias table 212 then issues processed microinstructions to a reservation station (RS) 214 in program order.

The reservation station 214 includes at least one register queue (RS queue or RS matrix). When the instruction is ready to be executed (the source operand of the instruction is ready), this instruction is scheduled and dispatched to the corresponding execution unit 216 by the register queue.

Execution units 216 may include one or more integer execution units, such as integer arithmetic logic units, one or more floating point execution units, memory order buffers (MOB s), and the like. The microprocessor 150 may typically access the memory module 160 through memory-type instructions.

Please refer to FIG. 2, which is a flowchart illustrating an instruction execution method 200 according to an embodiment of the present invention.

In step 210, the instruction cache 202 stores a target instruction. Furthermore, the following is for the convenience of description; the target instruction is referred to as target instruction TAI.

In step 220, the instruction translator 204 translates the target instruction TAI to determine whether the target instruction TAI is a specific instruction. When the target instruction TAI is a specific instruction, a model specific register index of the target instruction TAI is obtained to perform a specific operation. The model specific register index indicates the address of the model specific register, or a segment (such as an index segment) of the address of the model specific register.

In one embodiment, when the instruction translator 204 determines that the target instruction TAI (or a certain segment thereof) conforms to a specific encoding rule, it determines that the target instruction TAI is a specific instruction.

Figure 3:
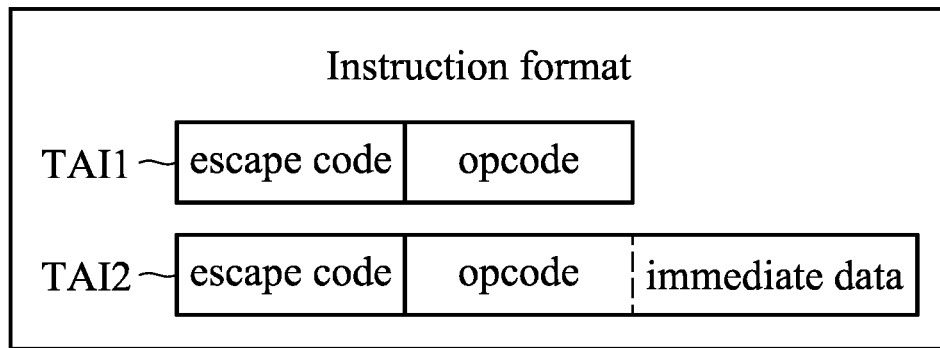
FIG. 3 is a schematic diagram illustrating an instruction format according to an embodiment of the present invention.

Please refer to FIG. 3. FIG. 3 illustrates a format of target instruction TAI according to an embodiment of the present invention. The target instruction TAI includes a first type of target instruction TAI1 and a second type of target instruction TAI2. The first type of target instruction TAI1 includes an escape code and an operation code (opcode). The opcode of the first type of target instruction TAI1 may include a model specific register index to point to an address of a model specific register within the model specific register set 238. When the instruction translator 204 determines that the first type of target instruction TAI1 (or the opcode therein) conforms to a specific encoding rule, it determines that the first type of target instruction TAI1 is a specific instruction. The second type of target instruction TAI2 includes escape code, opcode and immediate data. The opcode or immediate data of the second type of target instruction TAI2 may also include a model specific register index to point to a model specific register within the model specific register set 238. When the instruction translator 204 determines that the second type of target instruction TAI2 (or the opcode/immediate data in it) conforms to a specific encoding rule, it determines that the second type of target instruction TAI2 is a specific instruction. According to an embodiment of the present invention, the immediate data of the second type of target instruction TAI2 may be combined with the opcode, so that the second type of target instruction TAI2 may be regarded as the first type of target instruction TAI1. The opcode of the first type of target instruction TAI1 may also be divided into immediate data, so that the first type of target instruction TAI1 may be regarded as the second type of target instruction TAI2, and the present invention does not limit the actual implementation. The target instruction TAI mentioned below may be the first type of target instruction TAI1 or the second type of target instruction TAI2.

Figure 4:
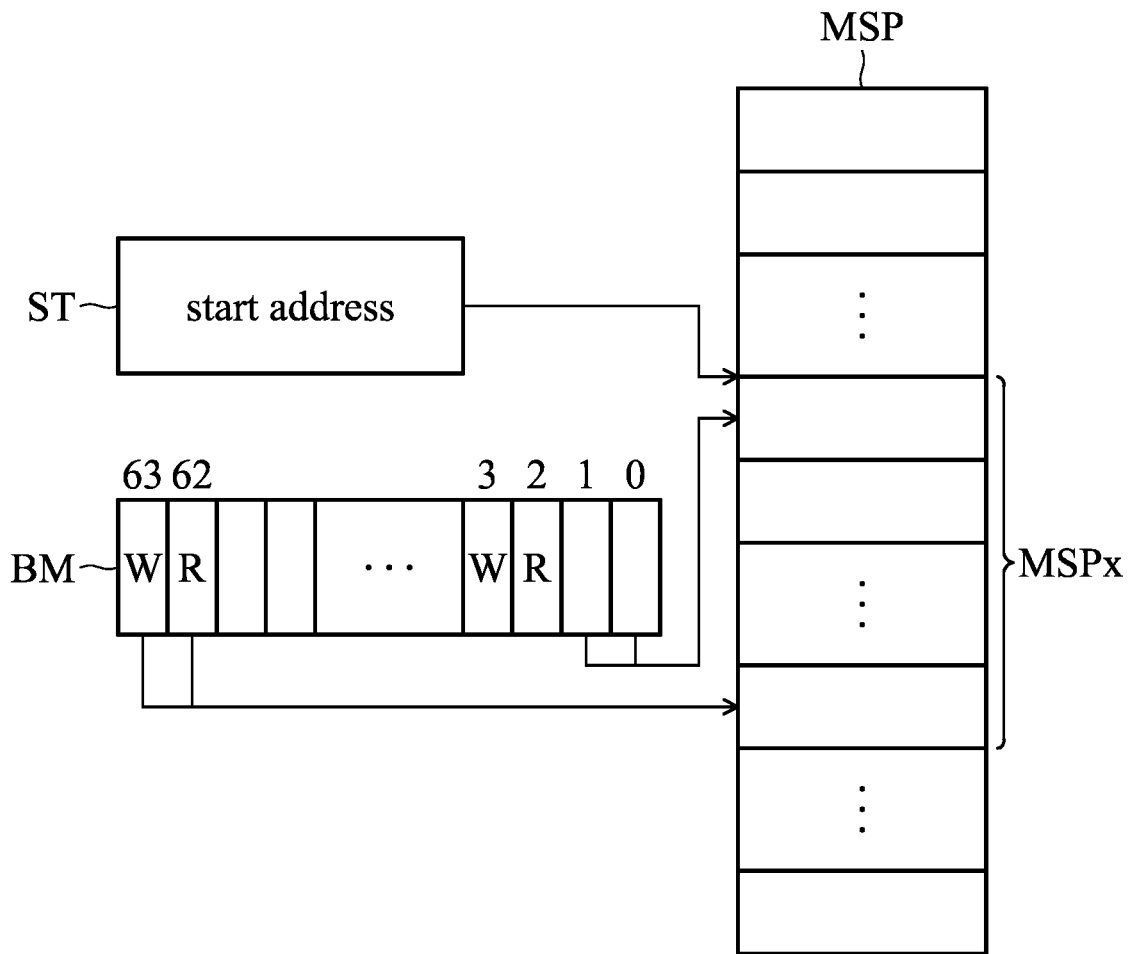
FIG. 4 is a schematic diagram illustrating a model specific register space MSPx where a model specific register index is accessing according to an embodiment of the present invention.
Figure 5:
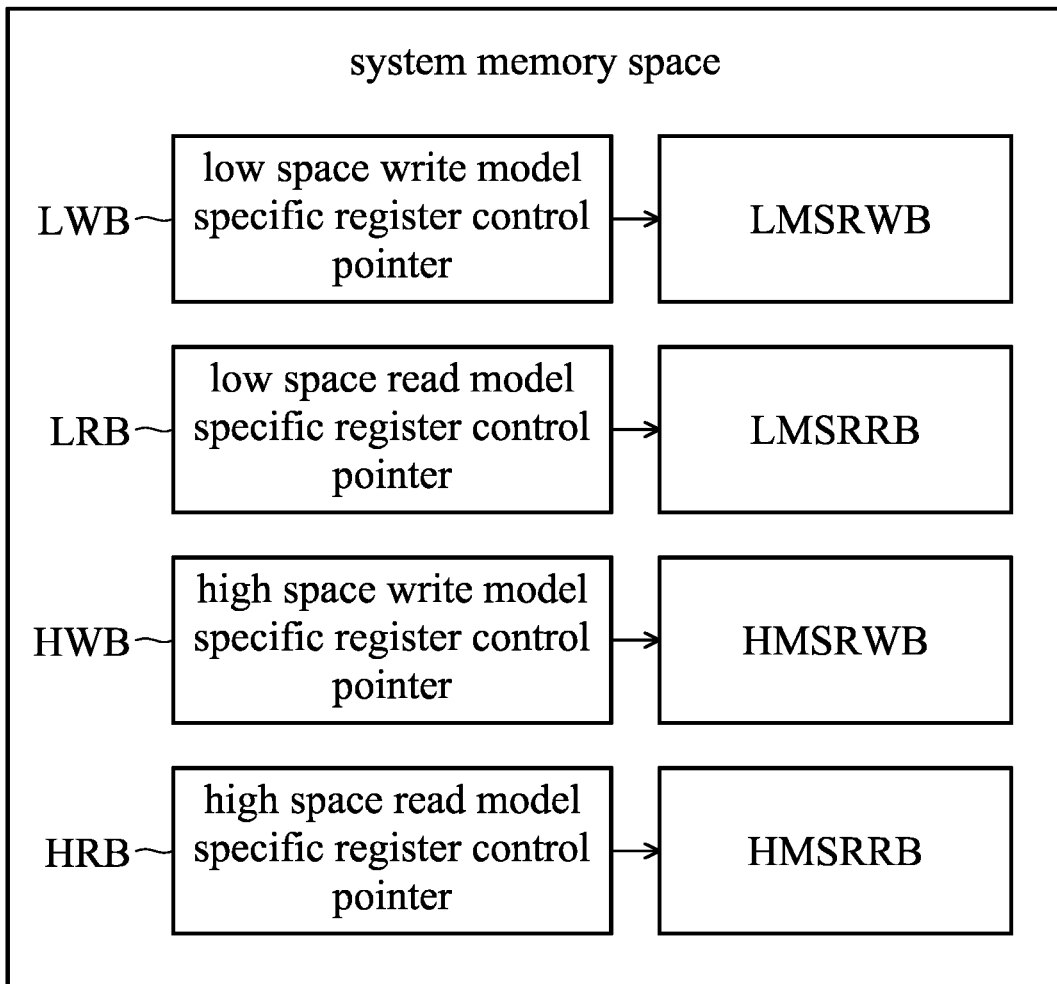
FIG. 5 is a schematic diagram illustrating another model specific register space where a model specific register index is accessing according to an embodiment of the present invention.

The following will describe how to determine whether a specific instruction in the unprivileged state has the right to access a model-specific register with reference to FIG. 4 and FIG. 5. First, please refer to FIG. 4. FIG. 4 is a schematic diagram illustrating a model specific register space MSPx where a model specific register index is accessing according to an embodiment of the present invention, which is suitable for an authorization confirmation operation in a user mode.

FIG. 5 is a schematic diagram illustrating another model specific register space MSPx where the model specific register index is traversed if the model specific register indicated by a model specific register index is missed in the MSPx of FIG. 4 according to an embodiment of the present invention. Detailed description will be given later.

In one embodiment, when the target instruction TAI is a specific instruction, the microprocessor 150 determines if the model specific register indicated by the target instruction TAI is accessible by searching a continuous model specific register space MSPx (associated with the model specific register set 238 inside the microprocessor 150) defined by a start address ST and a BitMap BM according to the instruction of the target instruction TAI. When the continuous model specific register space MSPx is traversed, the microprocessor reads each read indication bit R and each write indication bit W in the BitMap BM. The read indication bit R of the model specific register space MSPx indicates if an associated model specific register is readable in unprivileged mode, while the write indication bit W of the model specific register space MSPx indicates if an associated model specific register is writable in unprivileged mode. Exemplarily, when the bit value of the read indication bit R is 1, it means that the corresponding model specific register may be read in an unprivileged state. Likewise, when the bit value of the write indication bit W is 1, it indicates that the corresponding model specific register may be written in an unprivileged state.

As shown in FIG. 4, in this embodiment, the read indication bit R and write indication bit W of a model specific register in BitMap BM are adjacent. BitMap BM totally has 64 bits, which may be divided into 32 groups (each group encompasses a read indication bit R and a write indication bit W) corresponding with the model specific registers with one-by-one manner. For example, BM[63], that is the last 64th bit is the write indication bit W; BM[62], that is the 63rd bit is the read indication bit R. The write indication bit W (BM[63]) and the read indication bit R (BM[62]) are a pair, corresponding to the same model specific register. Although this example uses adjacent BM[62] and BM[63] as a pair, the read indication bit R and write indication bit W in a pair may not necessarily be adjacent, and different pairs may not necessarily be adjacent as well. Practically, it is applicable as long as the read/write indication bits R/W of each group respectively corresponds to associated model specific register. For example, BitMap may be divided into a high-order part and a low-order part, the high-order part includes the high-order 32 bits of BitMap BM for storing read indication bits R, and the low-order part includes the low-order 32 bits of BitMap BM for storing write indication bits W. Each model specific register in the model specific register space MSPx corresponds to a bit of the high-order part and a bit of the low-order part, respectively. In addition, each read indication bit R and write indication bit W of a group may be set to different values. For example, the read indication bit R and write indication bit W of a group may be set to 1 and 0, respectively, which means that this model specific register may be read but not be overwritten in unprivileged state. Or, the read indication bit R and write indication bit W of a group may be set to 0 and 1, respectively, which means that the corresponding model specific register may not be overwritten but may be read in unprivileged state. The read indication bit R and write indication bit W of a group may also be set to the same value. For example, setting the read indication bit R and write indication bit W of a group to 1 at the same time means that the corresponding model specific register may be read or overwritten in the unprivileged state. And, a model specific register may be prohibited from reading and overwriting in the unprivileged state if the read indication bit R and write indication bit W in associated group is set to 0 simultaneously.

The BitMap BM shown in FIG. 4 is only for the convenience of explaining an embodiment of the present application and is not used to limit the number of bits of the BitMap BM as well as the number of corresponding model specific registers (also referred to as the length of the model specific register space MSPx). It is also not used to limit the effective number of bits of BitMap BM (that is, the number of bits that may indicate the readable/writable bits of the corresponding model specific register) and the number of corresponding model specific registers (also known as the length of the model specific register space MSPx). In the embodiment, the BitMap BM includes M read indication bits R as well as M write indication bits W, corresponding to M consecutive model specific registers in the model specific register space MSPx. In addition, M is a positive integer, which may be less than or equal to half of the bit number of BitMap BM.

In another embodiment, when the continuous model specific register space MSPx is determined, the microprocessor reads a read-write indication bit RW in the BitMap BM. From the read-write indication bit RW, it is known whether a corresponding model specific register in the model specific register space MSPx may be read and written (associated MSR is both readable and writable by the specific instruction). At this time, for example, in the BitMap BM shown in FIG. 4, 64 bits are all read-write indication bits RW (associated with 32 model specific registers, respectively). Each read-write indication bit RW corresponds to a model specific register in the model specific register space MSPx is to indicate whether the model specific register is both readable and writable. When the bit value of the read-write indication bit RW is 1, it means that the corresponding model specific register may be read and overwritten in the unprivileged state. When the bit value of the read-write indication bit RW is 0, it means neither read nor write operation is performed on the corresponding model specific register under the unprivileged state. The number of effective ones in all the read-write indication bits RW of BitMap BM depends on the number of model specific registers that may be read and written in the unprivileged state in the model specific register space MSPx. Therefore, in this embodiment, the read-write indication bits RW of BitMap BM is N bits, corresponding to N consecutive model specific registers. N is a positive integer, which may be less than or equal to the number of bits of BitMap BM.

In one embodiment, an offset value may be used to provide an extension or reduction in the length of the model specific register space MSPx. For example, the basic length of the model specific register space MSPx may be set to 30 (that is, including 30 consecutive model specific registers), and it may be extended to 70 by using the offset value (+40). Meanwhile, an additional set of BitMap BM (for example, BitMap BM includes 64 read-write indication bits RW) or two additional sets of BitMap BM (for example, BitMap BM includes 32 read indication bits R and 32 write indication bits W) is required accordingly (this additional space may be 26=64 bits, which is larger than the current requirement, 40 bits). The length of the model specific register space MSPx may also be reduced to 20 by means of the offset value (−10), and the BitMap may be reduced in the same way. That is to say, the offset value may be used to further determine the length of the model specific register space MSPx from the start address of the continuous model specific register space MSPx to the address indicated by the offset value as the end of the continuous model specific register space MSPx (so as to increase or decrease the length of MSPx as a requirement). Please note the MSPx shown in FIG. 4 may be allocated in caches within the microprocessor 150, and the aforementioned additional MSPx may be extended directly from where the current MSPx is allocated, or being allocated in the memory module 160 (this embodiment will be illustrated mode detailed by accompanied with FIG. 5 later). This present application does not limit the place where the additional MSPx is allocated.

In addition, the BitMap BM of the present application is set for model specific registers, and the start address ST and possible offset value are stored in another model specific register, and an input/output system (Basic Input/output System, BIOS) may be executed to initialize the BitMap BM by using the start address ST and a possible offset value. The BitMap BM, or the start address ST and the possible offset value may be changed/modified by using the conventional read/write approaches under the privilege state, or may be changed/modified by using the read/write approach under unprivileged state, which will be described more detailed later. However, the present application is not limited to the use of model specific registers. In another embodiment, the BitMap BM, start address ST and possible offset value shown in FIG. 4 may also be configured by using other registers in the microprocessor 150. By reading and writing these other registers, the initialization and modification of BitMap BM, start address ST and possible offset value may be implemented.

In one embodiment, when the target instruction TAI is a specific instruction, the instruction translator 204 obtains the model specific register index from the target instruction TAI, and then associated microcode is performed thereafter. The microcode first queries the model specific register space MSPx. If the model specific register index corresponds to the model specific register indicated by the target instruction TAI (or "the specific instruction) is within the MSPx of the model specific register space, the BitMap BM is traversed to get the corresponding read and write indication values to confirm whether the target instruction TAI has read-write permissions for accessing the model specific register it indicated. That is, it is confirmed whether the model specific register may be read and written by the target instruction TAI.

Next, referring to FIG. 5, which illustrates the case that the model specific register of the model specific register set 238 in the microprocessor which in indicated by a target instruction TAI but is not indexed in the MSPx of FIG. 4. Please refer to FIG. 5. FIG. 5 is a schematic diagram illustrating another model specific register space according to an embodiment of the present invention. It is also suitable for determining whether a specific instruction in the unprivileged state has the permission to read and write a model specific register. In one embodiment, if the target instruction TAI is a specific instruction, but the corresponding model specific register is not indexed in the model specific register space MSPx, then the target instruction TAI instructs the microprocessor 150 to traverse a continuous 1 kilobyte (KB) of a BitMapLMSRRB through a low space read model specific register control pointer LRB (hereinafter referred to as the control pointer LRB) to find the read indication value R corresponding to the target instruction TAI. In addition, the microprocessor 150 is instructed to traverse a continuous 1 KB BitMapLMSRWB through a low space write model specific register control pointer LWB (hereinafter referred to as the control pointer LWB) to find the write instruction value W corresponding to the target instruction TAI. The BitMapLMSRRB and the BitMapLMSRWB are both stored in the system memory space. The control pointer LRB and the control pointer LWB may come from inside the microprocessor 150.

In one embodiment, if the target instruction TAI is a specific instruction, but the corresponding model specific register is not indexed in the aforementioned model specific register space MSPx (shown in FIG. 4), then the target instruction TAI instructs the microprocessor 150 to traverse a continuous 1 KB of a BitMapLMSRRB through a low space read model specific register control pointer LRB (hereinafter referred to as the control pointer LRB) to find the read indication value R corresponding to the target instruction TAI. In addition, the microprocessor 150 is instructed to traverse a continuous 1 KB BitMapLMSRWB through a low space write model specific register control pointer LWB (hereinafter referred to as the control pointer LWB) to find the write instruction value W corresponding to the target instruction TAI. The BitMapLMSRRB and the BitMapLMSRWB are both stored in the system memory. The control pointer LRB and the control pointer LWB may come from inside the microprocessor 150.

Generally speaking, the microprocessor 150 may first search for BitMapLMSRRB and BitMapLMSRWB (the 2 KB spaces associated with LWB and LRB), and then search for BitMapHMSRRB and BitMapHMSRWB (the 2 KB spaces associated with HWB and HRB). The microprocessor 150 may also search BitMapHMSRRB and BitMapHMSRWB at first, and then search BitMapLMSRRB and BitMapLMSRWB. However, if the read-write indication bit of the corresponding model specific register has been found in the BitMap during the first search (i.e., the read/write indication bits R/W are found in the 2K spaces associated with LMSRWB and LMSRRB), it is not necessary to traverse the BitMap that was searched later (i.e., the search in the 2K spaces associated with HMSRWB and HMSRRB is unnecessary). According to an embodiment of the present invention, the model specific register set 238 includes 1,000 to 2,000 model specific registers. Therefore, each bit of the BitMapLMSRRB and BitMapLMSRWB usually correspond to a model specific register, while some bits of the BitMapHMSRRB and BitMapHMSRWB may correspond to none of the model specific registers (because there may be unused spaces in the 2K spaces established by HWB and HRB). However, the present application is not limited to this. With the development of technology, more or less model specific registers may also be configured for the model specific register set 238 in designing the microprocessor 150. It is only necessary to adjust the bit number of each BitMap and/or the number of BitMaps as required. This another model specific register index shown in FIG. 5 may be stored in system memory whose storage space is generally larger than that of the microprocessor, such as caches packaged with the microprocessor. The present invention is not limited to this.

In another embodiment, the target instruction TAI instructs the microprocessor 150 to traverse a continuous 1 KB of a BitMapLMSRWB through a low space model specific register read-write control pointer LRWB (hereinafter referred to as the control pointer LRWB) to find the read-write indication bit RW corresponding to the target instruction TAI. The BitMapLMSRWB is stored in the system memory, and the control pointer LRWB comes from the inside of the microprocessor 150.

In another embodiment, the target instruction TAI further instructs the microprocessor 150 to traverse a continuous 1

KB BitMapHMSRWB through a high space model specific register read-write control pointer HRWB (hereinafter referred to as the control pointer HRWB) to find the read-write indication bit RW corresponding to the target instruction TAI. The BitMapHMSRWB is stored in the system memory, and the control pointer HRWB comes from the inside of the microprocessor 150.

Generally speaking, the microprocessor 150 may first search for LMSRWB, and then search for Bit-MapHMSRWB. The microprocessor 150 may also search BitMapHMSRWB at first, and then search BitMapLMSRWB. However, if the read-write indication bit of the corresponding model specific register has been found in the BitMap during the search, it is not necessary to continue searching for the BitMap that was searched later. According to an embodiment of the present invention, the model specific register set 238 includes 1,000 to 2,000 model specific registers, so that each bit of BitMapLMSRWB usually corresponds to a model specific register. On the other hand, BitMapHMSRWB may have some bits that do not correspond any of the model specific registers. However, the present application is not limited to thereto. With the development of technology, more or less model specific registers may also be configured for the model specific register set 238 in designing the microprocessor 150. It is only necessary to adjust the bit number of each BitMap and/or the number of BitMaps as required. This another model specific register index may be stored system memory whose storage space is generally larger than that of the microprocessor, such as caches packaged with the microprocessor. The present invention is not limited to this.

Figure 6:
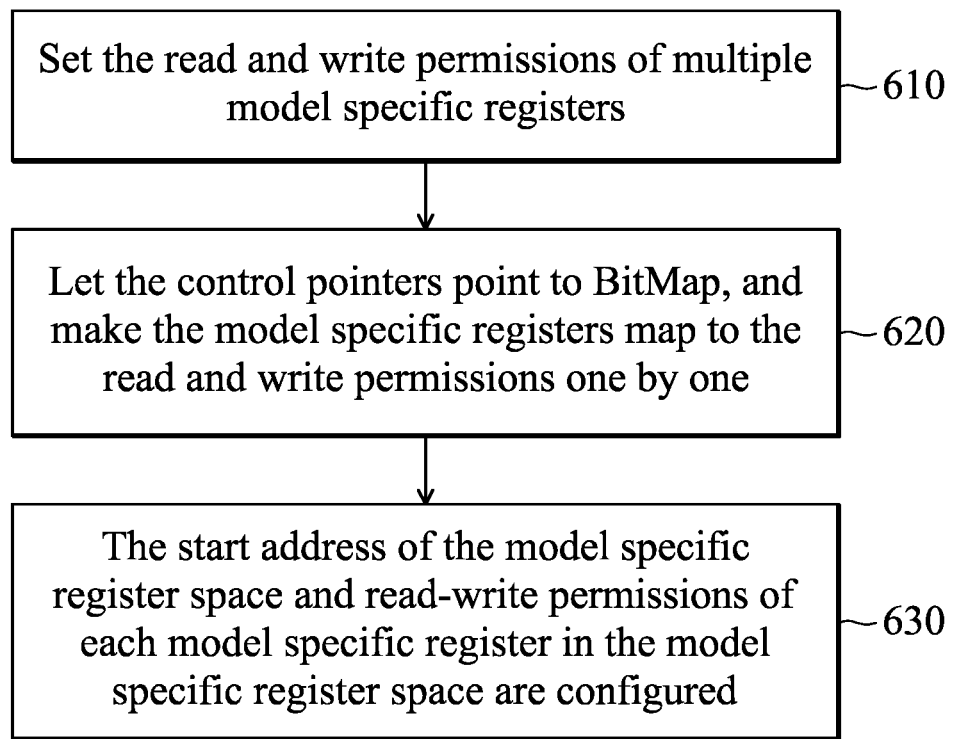
FIG. 6 is a flowchart illustrating setting a model specific register index according to an embodiment of the present invention.

The following describes how to configure (initialize) the BitMap in FIGS. 4 and 5 with reference to FIG. 6. FIG. 6 is a flow chart illustrating how the Basic Input/Output System (BIOS) executes to configure the memory BitMap according to an embodiment of the present invention. In one embodiment, in step 610, BitMapLMSRRB, LMSRWB, HMSRRB and HMSRWB (or BitMapLMSRWB and HMSRWB) shown in FIG. 5 and the read-write indication bits corresponding to each model specific register in these BitMaps are set. In step 620, the aforementioned control pointers LRB, LWB, HRB and HWB inside the microprocessor 150 are respectively pointed to the corresponding BitMapLMSRRB, LMSRWB, HMSRRB and HMSRWB (which may be referred by the target instruction TAI if it is a specific instruction), and to map these model specific registers to associated read-write indication bits one by one (or to point the control pointers LRWB and HRWB to the corresponding BitMapLMSRWB and HMSRWB respectively, so as to map these model specific registers to associated read-write indication bits one by one). In step 630, the start address (also referred to as the MSR base Address) of the model specific register space MSPx and read-write permissions of each model specific register in the model specific register space MSPx are configured according to the start address ST and BitMap BM (possibly including the offset value OFFSET). BitMapLMSRRB, LMSRWB, HMSRRB and HMSRWB; or BitMapLMSRWB and HMSRWB may be combined as a universal set of read-write permissions for each model specific register in the model specific register set 238. BitMap BM may be regarded as a subset of the universal set. In addition, BitMapLMSRRB, LMSRWB, HMSRRB and HMSRWB, may also be directly combined into a BitMap universal set, and the read-write permission value may be obtained by a control pointer; or BitMapLMSRWB and HMSRWB, may also be directly combined into a BitMap universal set, and the read-write permission value may be obtained by a control pointer.

The above means that if target instruction TAI is a specific instruction and a model specific register subspace (such as the model specific register space MSPx shown in FIG. 4) does not find the corresponding model specific register, so there is no need to traverse the BitMap subset (such as BitMap BM shown in FIG. 4) to obtain the corresponding read-write indication bit (or read/write indication bit). The target instruction TAI instructs the microprocessor 150 to traverse the BitMap universal set (such as BitMapLMSRRB, LMSRWB, HMSRRB, and HMSRWB) through control pointers (such as the control pointers LRB, LWB, HRB, and HWB shown in FIG. 5) to obtain the corresponding read-write indication bit (or read/write indication bit), so as to use the read-write indication bit (or read/write indication bit) to determine the read-write permission (or read/write indication bit) of the model specific register permission is enabled in an unprivileged state, and the target instruction TAI may instruct the microprocessor 150 to read and write (or read/write) the content therein.

In addition, according to a later embodiment of the present invention, the present application may only apply the indexing operation shown in FIG. 4 without implementing any indexing operation shown in FIG. 5 according to practical needs. At this time, the target instruction TAI instructs the microprocessor 150 to index the corresponding model specific register in a model specific register subspace only (for example, the model specific register space MSPx shown in FIG. 4). The corresponding read-write indication bit (or read/write indication bit) in a subset of BitMap (such as BitMap BM shown in FIG. 4) is obtained, so as to use the obtained read-write indication bit (or read/write indication bit) to determine whether the read-write permission (or read/write permission) of the model specific register is enabled in the unprivileged state. Furthermore, the target instruction TAI may instruct the microprocessor 150 to read and write (or read/write) the content therein. Correspondingly, step 630 of FIG. 6 may also be omitted from the configuration operation.

According to another embodiment of the present invention, the present application may directly apply the indexing operation shown in FIG. 5 without applying the indexing operation shown in FIG. 4 according to practical applications. At this time, the target instruction TAI instructs the microprocessor 150 to traverse the BitMap universal set (e.g., BitMapLMSRRB, LMSRWB, HMSRRB and HMSRWB) through control pointers (e.g., the control pointers LRB, LWB, HRB, and HWB shown in FIG. 5) to obtain the corresponding read-write indication bit (or read/write indication bit), so as to use the read-write indication bit (or read/write indication bit) to determine whether the read-write permission (or read/write permission) of the model specific register is enabled in the unprivileged state. Moreover, the target instruction TAI may instruct the microprocessor 150 to read and write (or read/write) the model specific register. Correspondingly, steps 610 and 620 may be omitted from the configuration operation shown in FIG. 6.

Figure 7:
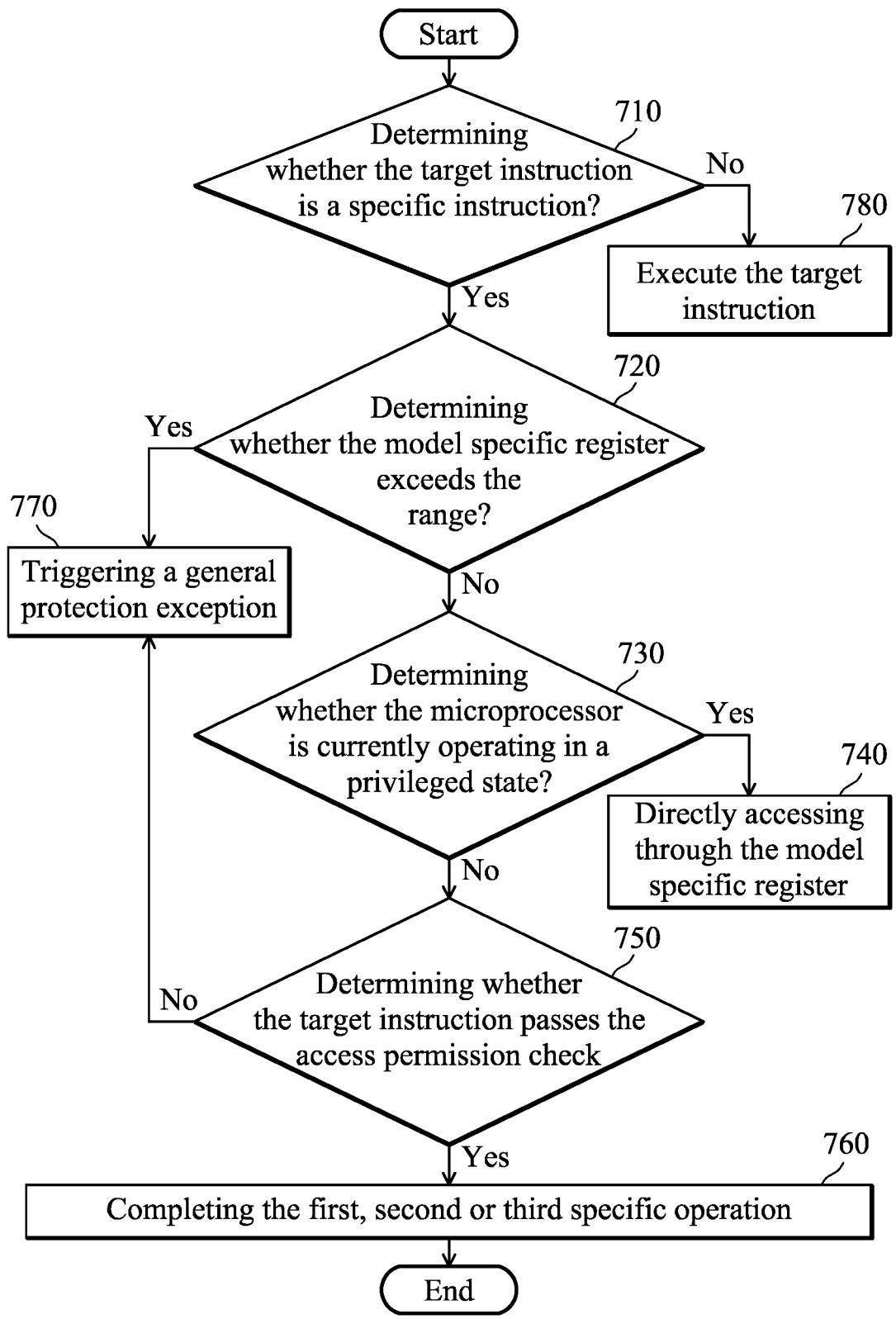
FIG. 7 is a flowchart illustrating the implementation of target instruction according to an embodiment of the present invention.

Please now refer to FIG. 7. FIG. 7 illustrates an operation flow of the target instruction TAI according to an embodiment of the present invention. In one embodiment, in step 710, the instruction translator 204 receives a target instruction TAI, and the instruction translator 204 determines whether the target instruction TAI (or the opcode/immediate data therein) conforms to the binary encoding rule of the specific instructions. When the target instruction TAI (or the opcode/immediate data in it) does not conform to the binary encoding rules of the specific instruction, it is determined that the target instruction TAI is not a specific instruction, and then step 780 is performed to execute the target instruction according to the execution mode of the non-specific instructions. For example, if the non-specific instruction is a MOV instruction, the MOV operation is performed according to the execution mode of the MOV instruction. When the target instruction TAI (or the opcode/immediate data in it) conforms to the binary encoding rule of the specific instructions, it is determined that the target instruction TAI is a specific instruction, and the step 720 is performed.

In step 720, the instruction translator 204 obtains the immediate data of the model specific register index or the opcode of the target instruction TAI, and determines whether the model specific register index exceeds the range of the space MSPx (of FIG. 4) where the model specific register set 238 is located. For example, assuming that the MSPx range of the model specific register is located is 0-1999, if the model specific register index is 1968, which indicates the model specific register index is not greater than/smaller than the upper/lower limit of the MSPx range. It is thus determined that the model specific register index does not exceed the scope of the MSPx range where the model specific register is located. If the model specific register index is 2001, which indicates that the model specific register index exceeds the MSPx range where the model specific register is located because the current model specific register index (2001) is greater than the upper limit of the space MSPx. Generally speaking, when the model specific register index in the target instruction TAI exceeds MSPx range where the model specific register is located, the step 770 is performed, and the microprocessor 150 triggers a general protection exception. When the model specific register index in the target instruction TAI does not exceed the range where the space MSP is located, the step 730 is executed.

In step 730, the instruction translator 204 uses a microcode, such as the microcode 208, to determine whether the microprocessor 150 is currently operating in a privileged state. When the microprocessor 150 is operating in the privileged state, the step 740 is performed. When the microprocessor 150 is not operating in the privileged state, the step 750 is performed.

In step 740, a corresponding model specific register in the specific model register set 238 may be directly queried through the index of the model specific register in the target instruction TAI, and the model specific register may be directly read and written. It should be noted that the direct read and write means that it is no longer necessary to read and write the model specific register by means of accessing associated general-purpose registers that stores an index related to the model specific register so as to avoid frequently switching values of those general-purpose registers (because the index of the model specific register of this application is obtained directly from associated specific instruction without any assistance from the general-purpose registers). Since the model specific register originally supports accesses in the privileged state, when the microprocessor 150 operates in the privileged state, the model specific register may be directly operated without the need to check for access permission.

In step 750, when the microprocessor 150 operates in an unprivileged state (for example, the operation is in a user state), it needs to perform an access permission check for the target instruction TAI (which is a specific instruction now). When the target instruction passes the access permission check, the process proceeds to step 760 to complete the specific operation indicated by the specific instruction. The access permission check is to obtain the model specific register index in the target instruction TAI through a microcode, such as microcode 208, in an unprivileged state, and to check whether the corresponding model specific register matches with a model specific register within the range of the model specific register space MSPx (shown in FIG. 4). If the model specific register index matches a model specific register within the range of the model specific register space MSPx, a group (or one) read-write indication bit corresponding to the matched model specific register is obtained from BitMap BM to determine that, in the unprivileged state, whether the target instruction TAI of the specific instruction has the permission to read and write the model specific register indicated by it. If the model specific register index does not match the corresponding model specific register within the range of the model specific register space MSPx, the microprocessor 150 traverses the aforementioned (shown in FIG. 5) model specific register space MSPx to obtain a model specific register corresponding to the model specific register index. As shown in FIG. 5 again, through the aforementioned control pointers LRB, LWB, HRB and HWB; or the aforementioned control pointers LRWB and HRWB; to BitMapLMSRRB, LMSRWB, HMSRRB and HMSRWB of the system memory space; or BitMapLMSRWB and HMSRWB, to obtain the read-write indication bit(s) of a model specific register corresponding to the model specific register index to determine whether the target instruction TAI of a specific instruction has the permission to read and write a corresponding model specific register in the unprivileged state. That is, it is to determine whether the corresponding instruction (specific instruction) has the access permission for a model specific register in the unprivileged state. Because the model specific register space MSPx includes the read-write indication bits of all model specific registers, it is unnecessary to confirm whether it includes the corresponding model specific register index again. In addition, if the read-write indication bit indicates that the model specific register is unreadable but writable, it indicates that the target instruction TAI does not have the permission to read the model specific register, but has the permission to write the model specific register (i.e., the read permission check fails but the write permission check passes). If the read-write indication bits indicate that the model specific register is readable but not writable, it indicates that the target instruction TAI does not have the permission to write the model specific register, but has the permission to read the model specific register (i.e., the write permission check fails but read permission passes). If the read-write indication bits indicate that the model specific register is both readable and writable, it indicates that the target instruction TAI has the permission to read and write the model specific register (i.e., both the read and write permission checks are passed). If the read-write indication bits indicate that the model specific register is neither readable nor writable, it indicates that the target instruction TAI does not have the permission to read and write the model specific register (i.e., both the read and write permission checks fail). Through the permission checks, it is determined whether the corresponding model specific register supports read and/or write in the unprivileged state, that is, whether the target instruction TAI of the specific instruction has the permission to read and/or write the corresponding model specific register. When the read/write permission of the model specific register is not enabled, that is, the target instruction TAI of the specific instruction does not have the permission to read/write the corresponding model specific register. However, if the microprocessor 150 is still instructed to perform read/write operations on the corresponding model specific register, the general protection exception in the aforementioned step 770 will be triggered. If the read/write permission of the model specific register is enabled, that is, the target instruction TAI of the specific instruction has the permission to instruct the microprocessor 150 to read/write the corresponding model specific register, then step 760 is performed.

Generally speaking, the privileged state corresponds to the Ring0 mode, and the unprivileged state corresponds to the non-Ring0 mode, such as Ring1, Ring2 or Ring3 (user mode) mode. In step 760, the microprocessor 150 will complete the first (e.g., to read/write the corresponding model specific register in the unprivileged state), second (the operations of FIGS. 8A/8B) or third specific operation (e.g., the operation of 9A/9B) according to the model specific register index in the target instruction TAI, and the target instruction TAI in step 760 may perform model specific operations on the entire domain (the entire model specific register set 238). It is not limited by whether it is operating in the privileged state, so these specific operations may also be executed in Ring1, Ring2, Ring3 (user mode).

When the model specific register index included in the target instruction TAI in step 760 is a second specific index, it means that the target instruction TAI is a second specific instruction. When the model specific register index included in the target instruction TAI in step 760 is a third specific index, it means that the target instruction TAI is the third specific instruction, and the processor should perform the third specific operation in step 760. When the model specific register index included in the target instruction TAI is neither the second specific index nor the third specific index, it means that the target instruction TAI is the first specific instruction, and the processor should perform the first specific operation in step 760. These first to third specific operations will be described in detail below.

Specifically, when the target instruction TAI is the first specific instruction, the microprocessor 150 performs the first specific operation in step S760, that is, reads/writes the corresponding model specific register in the unprivileged state, and the target instruction TAI of a specific instruction may instruct the microprocessor 150 to directly read and write a corresponding model specific register through the model specific register index, without backing up and restoring the contents of the general-purpose registers. In the unprivileged state (for example, in the user state corresponding to Ring3), the target instruction TAI of a specific instruction may also instruct the microprocessor 150 to directly read and write the corresponding model specific register after passing the permission checks. Likewise, there is no need to back up and restore the contents of the general-purpose registers. That is to say, the corresponding model specific register indicated by a specific instruction of the present invention may be accessed by using the first specific operation in the execution state of lower priority (e.g., Ring3), which is performed in a higher-priority execution state conventionally (e.g., Ring0).

The second specific operation that may be performed by the present application will be described below with reference to FIG. 8A and FIG. 8B.

Figures 8A, 8B:
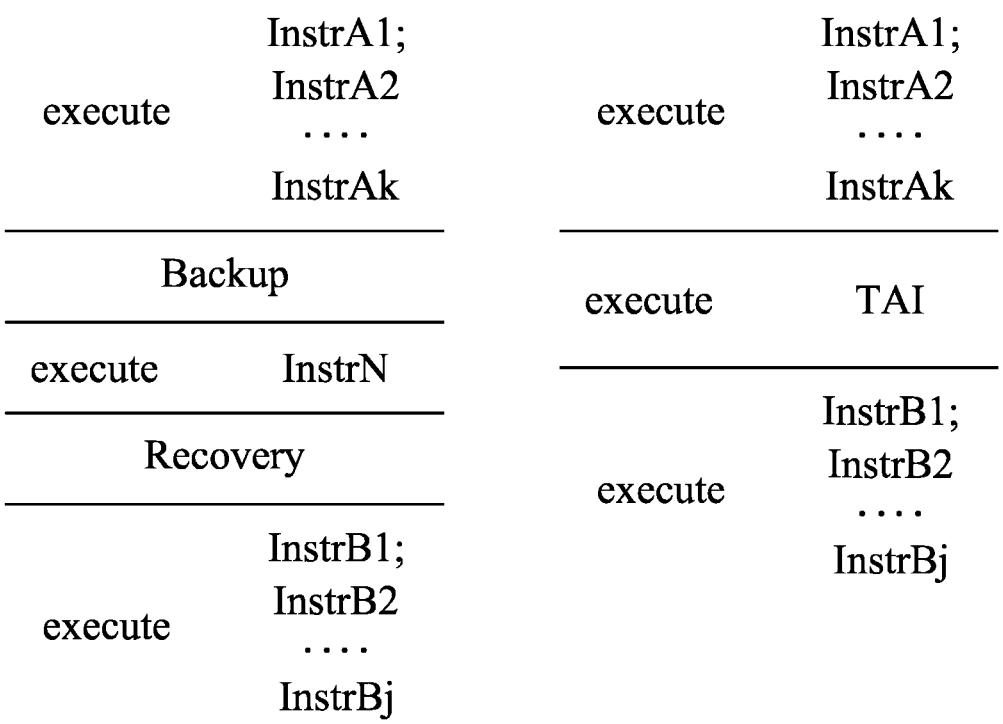
FIGS. 8A-8B are schematic diagrams illustrating an instruction serialization according to an embodiment of the present invention.

Specifically, as shown in FIG. 8A, in one embodiment, the microprocessor 150 executes the instruction serialization operation in program order by submitting an instruction InstrN after instructions InstrA1-InstrAk and before InstrB1-InstrBj. After all the previous instructions InstrA1-InstrAk have been executed (that is, all the write operations that need to be executed have been completed), the instruction InstrN is submitted, and then the subsequent instruction InstrB1-InstrBj is executed. Ideally, the implementation of the instruction InstrN does not affect the execution result of the entire program when the instruction InstrN is performed for instruction serialization. For example, the function of the instruction InstrN is not executed, or is executed without affecting the contents of relevant registers. However, when the instruction serialization is performed by means of InstrN, the function of the instruction InstrN may be implemented actually if the instruction InstrN is performed as the first specific instruction (since the associated MSRs may be overwritten), which will inevitably affect the content of the relevant registers. Therefore, it is usually necessary to back up register contents which may be affected in performing the instruction serialization operation before executing the instruction InstrN and after the instructions InstrA1-InstrAk are executed are implemented completely. The backup contents are then restored before executing the instructions InstrB1-InstrBj, so as to prevent whole the instruction execution results from affecting by incorrect register contents (because the data given to the instructions InstrB1-InstrBj may be modified due to the execution of the function of the instruction InstrN itself. The instruction InstrN may be the instruction INVD (Invalidate Internal Caches), INVEPT (Invalidate Translations Derived from EPT), INVLPG (Invalidate TLB Entries), INVVPID (Invalidate Translations Based on VPID), LGDT (Load Global Descriptor Table Register), LIDT (Load Interrupt Descriptor Table Register), LLDT (Load Local Descriptor Table Register), LTR (Load Task Register), MOV (to control register, with the exception of MOV CR8), MOV (to debug register), WBINVD (Write Back and Invalidate Cache) or the existing WRMSR (Write to Model Specific Register) instruction, and may be a CPUID (CPU Identification), IRET (Interrupt Return), or RSM (Resume from System Management Mode) instruction that supports operations in unprivileged mode.

For example, if the instruction InstrN is a CPUID instruction, because the CPUID instruction executes its own function at the same time, it is necessary to modify the contents of the general-purpose registers in executing the CPUID instruction. Specifically, in the current design, the execution of the CPUID instruction may modify the contents of the registers RAX/RBX/RCX/RDX, so that the contents of these registers need to be backed up firstly, and then the backed up contents of these registers are restored after executing the CPUID instruction.

To solve this problem, as shown in FIG. 8B, when the target instruction TAI is the second specific instruction (how to identify the second specific instruction will be demonstrate in the following paragraph), the microprocessor 150 performs the second specific operation in step 760. The second specific operation by performing the specific instruction TAI is step 760 is to substitute the specific instruction TAI for the instruction InstrN. This specific instruction TAI used as the second specific operation is defined to implement the instruction serialization operation only without performing its own function (i.e., without reading/writing associated model specific registers), such that associated store/restore processes may be removed because those register contents which are provided to the instructions InstrB1-InstrBj will not be modified.

Specifically, a specific instruction logic unit (not shown in FIG. 1) located in the instruction translator 204 is used to translate the operation to be performed by the target instruction TAI according to the model specific register index of the target instruction TAI. The instruction logic unit may also be constructed by the microcode 208, which is used to translate to determine whether the model specific register index is a second specific index. The second specific index is included in the second specific instruction and corresponds to a pre-specified model specific register (hereinafter referred to as model specific register A), and the second specific instruction specifies that the current execution is an instruction serialization operation of its preceding and following instructions. According to an embodiment of the present invention, the model specific register A is used to specify the second specific instruction, so that a current to-be-performed specific instruction indicates an instruction serialization if the model specific register A is addressed (i.e., the model specific register index is the second specific index).

When the specific instruction logic unit recognizes that the model specific register index is the second specific index, that is, when it translates and determines the current target instruction TAI is the second specific instruction and an instruction serialization operation is indicated, the specific instruction logic unit sends a stall message to the instruction cache 202 to stop the instruction cache 202 from receiving new instructions. The execution unit 216 detects whether the previous instructions InstrA1-InstrAk are all executed. Generally speaking, it is determined whether all the instructions InstrA1-InstrAk are completely executed by determining whether all the write operations performed by the instructions InstrA1-InstrAk have been completed. These write operations include the modifications of memory, registers, flag register, other caches, and the like. When it is detected that all write operations have been executed, it means that the instructions InstrA1-InstrAk have been executed completely. The instruction translator 204 retires the target instruction TAI which is now the second specific instruction, and then informs the instruction cache 202 of resuming to receive new instructions by means of a stall revocation notification from the specific instruction logic unit. In this embodiment, the microprocessor 150 may perform serialization on the previous instructions InstrA1-InstrAk and the subsequent instructions InstrB1-InstrBj through the target instruction TAI of the second specific instruction, without performing any read and/or write operation on the model specific register that is instructed by the target instruction TAI originally. Therefore, not only the data backup and restoration of general-purpose registers can be avoided, but also the data backup and restoration of model specific registers can be avoided as well.

The third specific operation performed by the present application will be described below with reference to FIG. 9A and FIG. 9B. When the target instruction TAI is the third specific instruction, the microprocessor 150 performs the third specific operation in step 760. The third specific operation refers to the operation of serializing the internal feature of another instruction by means of the target instruction TAI in the step 760 of this application.

Specifically, the specific instruction logic unit (not shown in FIG. 1) located in the instruction translator 204 translates the operation indicated by the target instruction TAI according to the model specific register index of the target instruction TAI. The specific instruction logic unit may be constructed based on the microcode 208. The translation is to determining whether the model specific register index is a third specific index, so as to determine whether the target instruction TAI is a third specific instruction. The third specific index is included in the third specific instruction and corresponds to another pre-specified model specific register different with the model specific register A (hereinafter referred to as model specific register B), and the third specific instruction specifies that the current execution is related to a serialization operation on an instruction internal feature. According to an embodiment of the present invention, the model specific register B is used to specify the third specific operation. Therefore, a current to-be-performed specific instruction indicates an internal feature serialization operation of the instruction if the model specific register B is addressed (i.e., the model specific register index is the third specific index).

When the model specific register index is the third specific index, it is known that the current execution is an internal feature serialization operation, and the target instruction TAI instructs the microprocessor 150 to read the internal bits of the model specific register B and then determines whether each feature in associated instruction is executed as well as associated execution priority. In terms of execution flow, the instruction whose internal features are serialized may be any instruction other than target instruction TAI, for example, a complex instruction comprising multiple execution steps or sub-instructions. The read and write permissions of the model specific register B may be enabled for the target instruction TAI (for the third specific instruction) with the corresponding model specific register index in the unprivileged state, so that there is no such a restriction that the model specific register B is read and written only in the privileged state. Alternatively, the read and write permissions of the other pre-specified model specific register may be disenabled such that is may only be read and written in a privileged state. The following describes how to serialize the internal characteristics of the instruction.

Figure 9A:
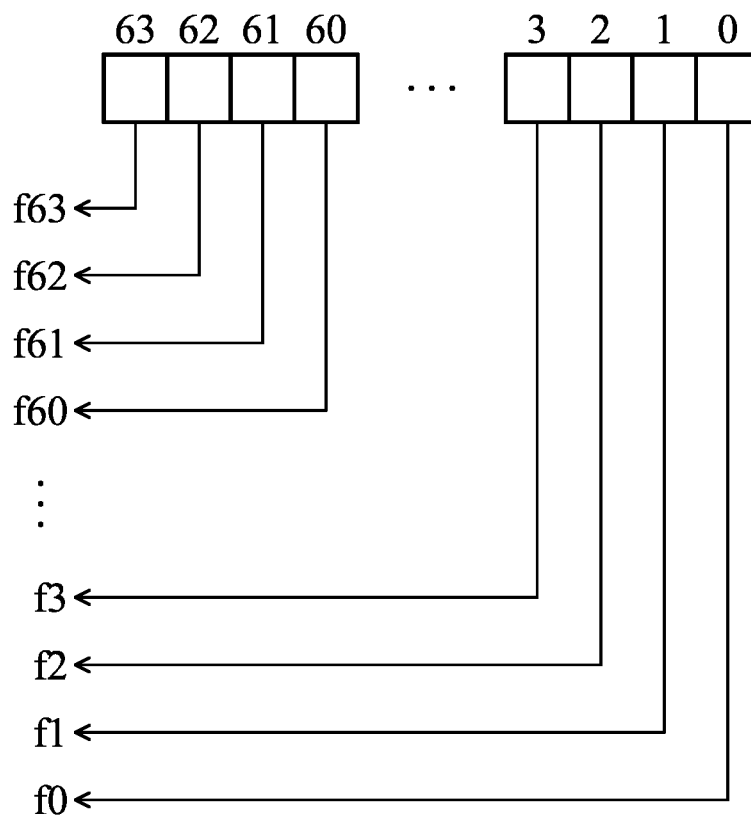
FIGS. 9A-9B are schematic diagrams illustrating a pre-designated model specific register used for implementing internal feature serialization according to an embodiment of the present invention.
Figure 9B:
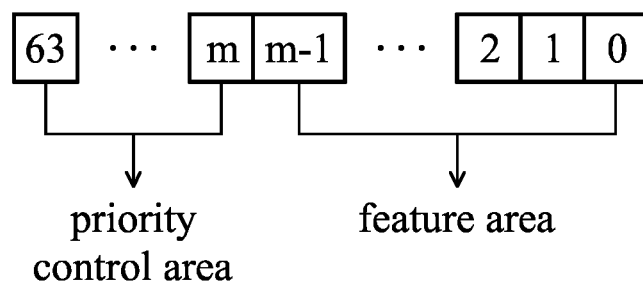

Please refer to FIGS. 9A to 9B. FIGS. 9A to 9B are bit diagrams illustrating a model specific register B that implements serialization of internal features of an instruction according to an embodiment of the present invention. When the target instruction TAI of a specific instruction is executed, if the model specific register index of the target instruction TAI corresponds to model specific register B. As shown in FIG. 9A, each bit in the model specific register B corresponding to an internal feature of the instruction serialized by the internal feature may be read and sent to microcode 208 to indicate whether and in what order the internal feature is executed. For example, the internal feature of an instruction can be invalidate L1 cache, stop fetch, instruction serialize or the like. Specifically, when a bit in the model specific register B is the first value, such as logic 1, it may indicate that the corresponding internal feature is executed. When a bit in the model specific register B is a second value, such as logic 0, it may indicate that the corresponding internal feature is not executed. Based on these bits, the internal features of a complex instruction may optionally be implemented. How to serialize and execute these internal features depends on the position of the corresponding bits in model specific register B. For example, the lower the bit of the model specific register B is, the internal feature corresponding to this bit will be executed first (the higher the priority), but this is only a manual setting. Those skilled in the art should know that the internal features of the instructions corresponding to these bits may be executed reversely or in any customized order. The internal features of the instruction here may correspond to the characteristic behavior of the microprocessor 150 when the instruction is executed, or the microinstructions, actions, attributes, characteristics, etc., which are sequentially implemented due to the execution of the instruction.

The following describes how to execute the internal features of the instructions corresponding to these bits reversely or under any customized order with reference to FIG. 9B. In FIG. 9B, the m+1th bit (symbol m) to the 64th bit of the model specific register B are the priority control area, and the 1st to m-th bits (symbol m−1) are the internal feature area. The m+1th bit (symbol m) to the 64th bit are used to indicate the order in which the internal features corresponding to the 1st to m-th bits (symbol m−1) are executed.

Specifically, by applying the model specific register B shown in FIG. 9B, the first to m-th bits (symbol m−1) each corresponds to an internal feature of an instruction. When executing the target instruction TAI that is a specific instruction, if the model specific register index of the target instruction TAI specifies the model specific register B, then the internal characteristics of an instruction are serially implemented according to the indications of the 1st to m-th bits (symbol m−1) bits. Generally speaking, by default, the lower the bit of the pre-specified model specific register shown in FIG. 9B, the higher the priority of the feature in the instruction is executed. However, the m+1th to 64th bits of the pre-specified model specific register shown in FIG. 9B, that is, Bit[m]-Bit[63], may be used to adjust the priority setting. By overwriting these Bit[m]-Bit[63], the execution order of the internal features of the instruction may be changed.

For example, assuming that m is 62. When the 63rd bit to the 64th bit are a third value, such as "00", it indicates that the 1st to m-th bits (symbol m−1) are sent to microcode 208 in the order from low to high, which also indicates the order in which the corresponding internal features are executed. When the 63rd bit to the 64th bit are the fourth value, such as "01", it indicates that the 1st to m-th bits (symbol m−1) are sent to the microcode 208 in the order from high to low, which also indicates the order in which the corresponding internal features are executed. When the 63rd bit to the 64th bit are the fifth value, such as "10", it indicates that the 1st to m-th bits (symbol m−1) are sent to microcode 208 in the order starting from the middle to the left firstly and then from the middle to the right, which also indicates the order in which the corresponding internal features are executed. However, these examples are only used to describe how to define the order in which the internal features of the instructions corresponding to these bits are executed. Those skilled in the art should know that the internal features of the instructions may also be executed in other orders.

In one embodiment, the internal features of these instructions are multiple instructions/operations/properties/features in another complex instruction supported by the target instruction TAI of the specific instruction.

In one embodiment, the target instruction TAI of a specific instruction may also determine the order in which the internal features of a complex instruction are executed according to the bits in the pre-specified model specific register.

In one embodiment, an identical opcode accompanied different operands (e.g., MSRUSERMODE EAX, MSRUSERMODE, MSRUSERMODE TAI_Instruction) may be used for the first, second, and third specific instructions, respectively, as another embodiments of implementing these three specific instructions.

In one embodiment, these bits in the pre-specified model specific register may be initialized by the aforementioned (shown in FIG. 7) method of directly reading and writing the model specific register in a privileged state or an unprivileged state, or the commonly used method to initialize by reading and writing model specific register through general-purpose registers in privileged state.

In one embodiment, the bits in the pre-specified model specific register may be overwritten to adjust the operation orders performed by a complex instruction. The bits in the pre-specified model specific register may be written in the aforementioned method (shown in FIG. 7) by directly writing the model specific register in a privileged state or an unprivileged state, or by writing the general-purpose register read and write method used in the privileged state conventionally.

To sum up, the instruction execution method and instruction execution device of the present invention may use the instruction translator to translate the target instruction to determine whether the target instruction is a specific instruction, and when the target instruction is a specific instruction, a model specific register index of the target instruction is obtained, to directly access a model specific register.

In addition, the microprocessor may also serialize the execution of the preceding and following instructions through a target instruction, and the microprocessor does not need to perform the traditional serialization behavior, which needs to back up and restore data thereon. This doesn't affect the context, either.

Moreover, the microprocessor can also serialize the execution of the internal feature of another instruction through a target instruction. The execution order of the internal features of the other instruction can be adjusted by overwriting a pre-specified model feature register or adjusting the priority policy bits. The other instruction may be a complex instruction that includes multiple internal features.

While the invention has been described by way of example and in terms of the preferred embodiments, it should be understood that the invention is not limited to the disclosed embodiments.

What is claimed is:

1. An instruction execution method for a microprocessor, wherein the microprocessor comprises a model specific register (MSR), and the instruction execution method comprises:
   receiving a target instruction using an instruction cache;
   decoding the target instruction using an instruction translator to determine whether the target instruction is a specific instruction;
   wherein when the target instruction is the specific instruction, a model specific register index of the target instruction is obtained to directly read or write the model specific register; and
   confirming that the model specific register index is in a complete space where the model specific register is located.

2. The instruction execution method of claim 1, further comprising:
   configuring a read or write indication bit of the model specific register in a Basic Input/Output System (BIOS).

3. The instruction execution method of claim 1, wherein the target instruction runs in a privileged state or a user state.

4. The instruction execution method of claim 3, further comprising:
   matching the model specific register index to the model specific register when the target instruction runs in the privileged state; and
   directly reading or writing the model specific register.

5. The instruction execution method of claim 3, further comprising:
   matching the model specific register index to the model specific register when the target instruction runs in the user state; and obtaining a read or write indication bit of the model specific register, which indicates read or write permission of the target instruction to the model specific register.

6. The instruction execution method of claim 5, wherein the read or write indication bit of the model specific register is obtained from a first mapping table, which is in the microprocessor and the first mapping table points to a subspace where the model specific register is located.

7. The instruction execution method of claim 5, wherein the read or write indication bit of the model specific register is obtained from a second mapping table, which is in a system memory space and the second mapping table points to the complete space where the model specific register is located.

8. The instruction execution method of claim 5, wherein when the target instruction has the read or write permission on the model specific register, the instruction translator directly reads or writes the model specific register.

9. The instruction execution method of claim 5, wherein when the read or write permission of the model specific register is disabled for the target instruction or the model specific register index is not in complete space where the model specific register is located, the microprocessor triggers a general protection exception.

10. An instruction execution device suitable for a microprocessor, comprising:
an instruction cache, configured to receive a target instruction;
a model specific register; and
an instruction translator, configured to obtain the target instruction from the instruction cache, decode the target instruction, and determine whether the target instruction is a specific instruction;
wherein when the target instruction is the specific instruction, the instruction translator obtains the model specific register index of the target instruction to directly read or write the model specific register;
wherein the instruction translator also confirms that the model specific register index is in a complete space where the model specific register is located.

11. The instruction execution device of claim 10, wherein the microprocessor configures a read or write indication bit of the model specific register in the microprocessor in a Basic Input/Output System (BIOS).

12. The instruction execution device of claim 10, wherein the target instruction runs in a privileged state or a user state.

13. The instruction execution device of claim 12, wherein when the target instruction runs in the privileged state, the instruction translator matches the model specific register index to the model specific register, and directly reads or writes the model specific register.

14. The instruction execution device of claim 12, wherein when the target instruction runs in the user state, the instruction translator matches the model specific register index to the model specific register and obtains a read or write indication bit of the model specific register; wherein the read or write indication bit indicates the read or write permission of the target instruction to the model specific register.

15. The instruction execution device of claim 14, wherein the read or write indication bit of the model specific register is obtained from a first mapping table, which is in the microprocessor and the first mapping table points to a subspace where the model specific register is located.

16. The instruction execution device of claim 14, wherein the read or write indication bit of the model specific register is obtained from a second mapping table, which is in a system memory space and the second mapping table points to the complete space where the model specific register is located.

17. The instruction execution device of claim 14, wherein when the target instruction has the read or write permission on the model specific register, the instruction translator directly reads or writes the model specific register.

18. The instruction execution device of claim 14, wherein when the read or write permission of the model specific register is disabled by the target instruction or the model specific register index is not in the complete space where the model specific register is located, the microprocessor triggers a general protection exception.

* * * * *